(12) United States Patent
Kurmi

(10) Patent No.: US 11,201,871 B2
(45) Date of Patent: Dec. 14, 2021

(54) DYNAMICALLY ADJUSTING ACCESS POLICIES

(71) Applicant: Uber Technologies, Inc., San Francisco, CA (US)

(72) Inventor: Ashish Kurmi, Redmond, WA (US)

(73) Assignee: Uber Technologies, Inc., San Francisco, CA (US)

( * ) Notice: Subject to any disclaimer, the term of this patent is extended or adjusted under 35 U.S.C. 154(b) by 325 days.

(21) Appl. No.: 16/226,459

(22) Filed: Dec. 19, 2018

(65) Prior Publication Data

US 2020/0204558 A1 Jun. 25, 2020

(51) Int. Cl.
*H04L 29/06* (2006.01)

(52) U.S. Cl.
CPC .......... *H04L 63/102* (2013.01); *H04L 63/105* (2013.01); *H04L 63/1425* (2013.01)

(58) Field of Classification Search
CPC . H04L 63/102; H04L 63/105; H04L 63/1425; H04L 63/10; H04L 63/101; H04L 63/104; H04L 63/107; H04L 63/108
See application file for complete search history.

(56) References Cited

U.S. PATENT DOCUMENTS

| | | | |
|---|---|---|---|
| 6,212,511 B1 * | 4/2001 | Fisher | G06F 1/00 |
| 9,087,148 B2 * | 7/2015 | Giblin | H04L 63/20 |
| 9,264,449 B1 * | 2/2016 | Roth | H04L 63/102 |
| 9,411,673 B2 * | 8/2016 | Yoshizawa | G06F 11/0787 |
| 10,007,779 B1 * | 6/2018 | McClintock | G06F 21/45 |
| 10,148,701 B1 * | 12/2018 | Hecht | G06F 9/455 |
| 10,152,364 B2 * | 12/2018 | Young | G06F 11/0754 |
| 10,331,898 B2 * | 6/2019 | Nefedov | G06F 21/604 |
| 10,346,625 B2 * | 7/2019 | Anderson | G06F 21/6209 |
| 10,616,281 B1 * | 4/2020 | Chud | H04L 63/205 |
| 10,673,905 B1 * | 6/2020 | Chud | H04L 63/107 |
| 2002/0099952 A1 * | 7/2002 | Lambert | G06F 21/53 726/27 |
| 2005/0049999 A1 * | 3/2005 | Birn | G06F 11/3636 |
| 2006/0085841 A1 * | 4/2006 | Chavis | G06F 21/31 726/4 |
| 2013/0227352 A1 * | 8/2013 | Kumarasamy | G06F 11/1461 714/47.1 |
| 2014/0123276 A1 * | 5/2014 | Bush | G06F 21/62 726/21 |
| 2014/0215604 A1 * | 7/2014 | Giblin | G06F 11/328 726/21 |

(Continued)

*Primary Examiner* — Techane Gergiso
(74) *Attorney, Agent, or Firm* — Fenwick & West LLP

(57) ABSTRACT

A method of dynamically adjusting access privileges of system identities. A set of access logs associated with a system are analyzed in order to generate a restricted access policy for an over privileged system identity. An initial access policy of the system identity is replaced with the restricted access policy and a continuous monitoring and access management (CMAM) service is initiated. Access logs are collected for a monitoring time window and an access denied error can be extracted from the access logs. The access denied error can be compared to an ignore list and/or the access denied error can be added to the ignore list. Authorization checks can be performed to determine if the action associated with the access denied error is authorized. If the action is authorized, the access policy is adjusted to allow for performance of the action.

20 Claims, 6 Drawing Sheets

(56) References Cited

U.S. PATENT DOCUMENTS

| | | | |
|---|---|---|---|
| 2014/0281760 A1* | 9/2014 | Yoshizawa | G06F 11/3065 |
| | | | 714/57 |
| 2014/0298398 A1* | 10/2014 | Neely | H04L 63/10 |
| | | | 726/1 |
| 2017/0099292 A1* | 4/2017 | Kelley | H04L 63/20 |
| 2018/0293377 A1* | 10/2018 | Tomonaga | G06F 21/552 |
| 2020/0053090 A1* | 2/2020 | Kliger | G06N 20/00 |
| 2020/0293684 A1* | 9/2020 | Harris | G06F 21/45 |

* cited by examiner

DYNAMICALLY ADJUSTING ACCESS POLICIES

BACKGROUND

1. Technical Field

The subject matter described generally relates to system security, and in particular to managing access policies for system identities.

2. Background Information

In a software system, system identities can have a range of access privileges. A system identity can be any identity associated with a software system, such as a user, an application, an online service, etc. System owners often grant more privileges than a system identity requires for its functionality in order to avoid an unpleasant system experience. This can lead to accidental or intentional compromise of secure information, which is one of the most common security risks in the software industry. Reducing access privileges of system identities too aggressively can have a negative impact on system productivity and experience.

SUMMARY

Described embodiments enable access privileges of system identities to be adjusted dynamically. Over privileged system identities (e.g., an identity that has access to services that it does not need access to) can lead to system breaches and/or compromise of system functions. A method of dynamically adjusting access privileges of system identities can mitigate consequences in the event of a system malfunction and/or breach. In various embodiments, access logs associated with a system are collected and analyzed to generate a restricted access policy for an over privileged system identity. An initial access policy of the system identity is replaced with the restricted access policy. A continuous monitoring and access management (CMAM) module collects access logs for a monitoring time window (e.g., a pre-defined time period such as an hour, six hours, two days, etc.), and an access denied error can be extracted from the collected access logs. The access denied error is associated with an action, a resource, and a system identity. In some embodiments, the access denied error is compared to an ignore list and/or added to the ignore list. Authorization checks are performed to determine if the system identity is authorized to perform the action associated with the access denied error. If the action is authorized, the access policy of the system identity is adjusted to allow for performance of the action. The CMAM module can subsequently identify and analyze another error in the collected access logs. If another error is not identified, access logs are collected for another monitoring time window. Access logs can be collected for a series of monitoring time windows until errors do not exist in access logs collected over a monitoring time duration (e.g., a pre-defined time period including a plurality of monitoring time windows). As such, the system identity is considered to have an appropriate level of privilege (e.g., follow the principle of least privilege) and the system may be more secure.

DETAILED DESCRIPTION

Figure 1:
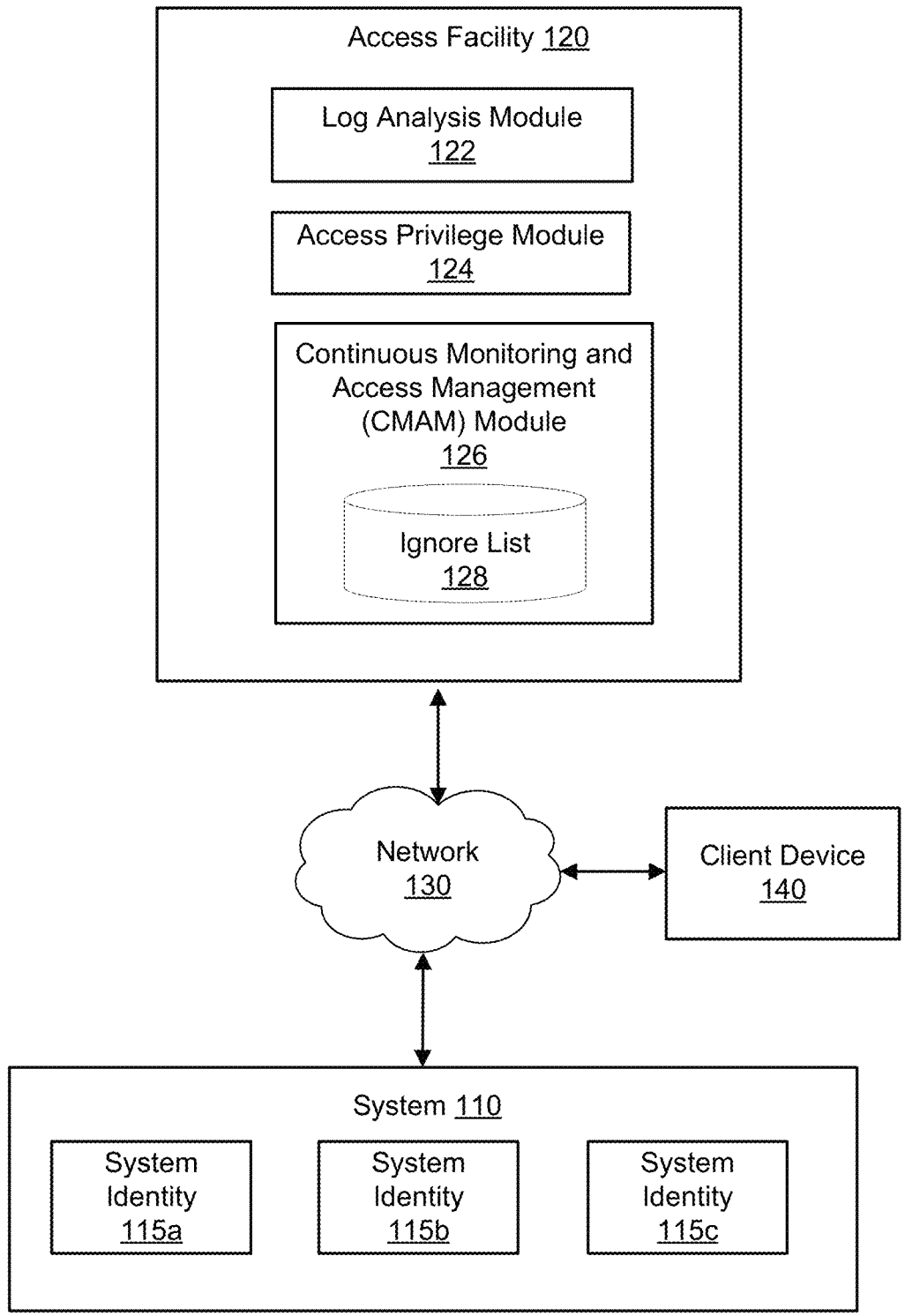
FIG. 1 is a block diagram illustrating a system environment for managing access policies of system identities, according to one or more embodiments.

The Figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview

A system identity is an identity, such as an application, an online service, a user, and/or other resource, associated with a software system. A software system can include one or more system identities where each system identity has an access policy that dictates the system identity's access level to one or more resources. To promote greater security, access policies should follow a principle of least privilege, according to which a system identity can only access resources that are necessary for the functionality of the system identity. A system identity is often over privileged—that is, it has an access policy that allows the system identity more access than is required for its functionality—because system owners may grant more authority than a system identity requires in order to improve system experience (e.g., it may be preferred that a system identity is over privileged rather than under privileged). Over privileged system identities increase the risk of security incidents and can compromise secure information. On the other hand, underprivileged system identities can negatively affect system experience and/or productivity, leading to inefficiency. It can be difficult and time consuming to manually adjust access privileges of a system identity to an appropriate level (e.g., to follow the principle of least privilege). Creating an automated process can allow for access policies to be adjusted without requiring extensive time from a human moderator.

In accordance with various embodiments, a system includes an over privileged system identity with an initial access policy. Access logs associated with the system are analyzed to generate a restricted access policy for the system identity, as described below. The initial access policy of the system identity is replaced with the restricted access policy. A continuous monitoring and access management (CMAM) service is subsequently configured to monitor access logs associated with the system over a pre-defined time period, as described in greater detail below. Access logs are collected for a monitoring time window (MTW) and an access-denied error in the collected access logs can be identified. If an access-denied error is identified, an identity, resource, and action are extracted from the error. In some embodiments, the error is compared to an ignore list to determine whether it can be ignored. If the error is not in the ignore list, the error is analyzed to determine if the error should be included in the ignore list. If the error should be included in the ignore list, the ignore list is updated to include the error and the error is subsequently ignored.

If the error is not ignored (e.g., the error is not or should not be included in the ignore list, or an ignore list does not exist), an authorization check is performed to determine whether the system identity should be authorized to perform the action extracted from the error. If the error passes the authorization check, as described in greater detail below in relation to FIG. 3, the restricted access policy of the system identity is updated to include (e.g., allow for performance of) the action extracted from the error. If the error fails the authorization check, the CMAM service can identify another access denied error in the access logs collected during the monitoring time window. The access denied error can be analyzed, or if another access denied error is not identified, the CMAM service can collect access logs for a second monitoring time window.

Access denied errors in the access logs collected during the second monitoring time window can be analyzed, or if access denied errors are not identified, the CMAM service can analyze access logs collected for a monitoring time duration (e.g., a period of time including multiple monitoring time windows). If errors exist in the monitoring time duration, the CMAM service may continue to monitor access logs for additional monitoring time window(s). If no errors are observed, the CMAM service is terminated, and the system identity is considered to have the appropriate privileges (e.g., follow the principle of least privilege access) and is no longer monitored.

In the embodiment described above, a system identity may effectively reach a least privilege access level (e.g., follow the principle of least privilege access). The system identity can have access to resources required for its functionality, but may not have access to resources optional for its functionality. Reducing privileges of system identities to follow the policy of least privilege access can prevent system breaches and/or minimize damage caused by a breach in an event that a system identity is compromised. Furthermore, the productivity and functional operations of a system identity following the least privilege access policy may not be significantly hindered during and/or after adjustment of access privileges. Current methods of reducing privileges to follow the principle of least privilege access require a great deal of time from a human. In the described embodiments, access policies can be adjusted without human moderation.

Example Systems

FIG. 1 is a block diagram illustrating a system environment 100 for adjusting access policies of system identities, according to one or more embodiments. In FIG. 1, the system environment 100 includes a system 110 connected to an access facility 120 and a client device 140 over a network 130. In other embodiments, the system environment 100 for adjusting access policies of system identities contains different and/or additional elements. In addition, the functions may be distributed among the elements in a different manner than described. The system 110 includes a plurality of system identities. For ease of illustration, FIG. 1 includes three system identities 115a, 115b, 115c, but in alternative embodiments, there are greater or fewer system identities associated with the system 110. In some embodiments, the system 110 can include hundreds or thousands of system identities. The system identities 115a, 115b, and 115c may be referred to herein in the singular or plural, i.e. as identities, system identities, an identity, a system identity, etc. A system identity (e.g., 115a, 115b, 115c) is an identity associated with a software system, such as an application, an online service, a user, and/or other software solution. A system identity (e.g., 115a, 115b, 115c) has an access policy that designates the system identity's level of access to internal and/or external resources. An access policy may be implemented prior to a system identity interacting with the system 110. When a system identity attempts to perform an action on a resource, a module may check a system identity's access policy to determine if the system identity is authorized to perform the action on the resource. If the system identity's access policy includes the action, the system identity can be allowed to perform the action. If the system identity's access policy does not include the action, the action may be denied (e.g., the system identity is prevented from performing the action, an error message is returned to the system identity, etc.). In the embodiment of FIG. 1, we assume for purposes of an illustrative example that the system identities 115a, 115b, and 115c are over privileged, though in an actual implementation, system identities may be under-, over-, or correctly privileged. An over privileged system identity has an access policy that allows the system identity more privileges than are necessary for its functionality.

The client device 140 is a computing device capable of receiving user input as well as transmitting and/or receiving data via the network 130. The client device 140 can have various forms such as a computer, a personal digital assistant (PDA), a tablet device, and other suitable devices. The client device 140 can be configured to interact with and/or provide input to the access facility 120. In some embodiments, the client device 140 can determine a time period for collecting access logs (e.g., a monitoring time window, a monitoring time duration), described in greater detail below. Although only one client device 140 is shown, in practice, fewer or greater client devices 150 may be connected to the network 130 at a given time.

The access facility 120 adjusts the access policy of a system identity (e.g., 115a, 115b, 115c). The access facility 120 is configured to receive a system identity (e.g., 115a, 115b, 115c) and/or its associated access policy via the network 130. The access facility 120 includes a log analysis module 122, an access privilege module 124, a continuous monitoring and access management (CMAM) module 126, and an ignore list 128. In alternative embodiments, the access facility 120 can include greater or fewer components than described herein. The components can also be distributed in a different manner or can perform different functions than described below.

In one embodiment, the access facility 120 can identify a system identity (e.g., 115a, 115b, 115c) that is over privileged. Generally, identities that have access to all instances of a particular resource are over privileged. For example, an employee (e.g., a system identity) has access to all of the floors (e.g., all instances) of a twelve-story building (e.g., a resource) where he/she works. It is likely that the employee does not need access to all of the floors (e.g., the employee only requires access to a floor where his/her office is located, a floor where the cafeteria is located, etc.). The access facility 120 may assume the employee is over privileged because he/she has access to all of the floors. In one embodiment, the access facility 120 may scan access policies of system identities to identify identities (e.g., employees) that have access to all or most instances of a resource (e.g., all floors of a twelve-story building) and these identities can be selected by the access facility 120. Alternatively, the log analysis module 122, described in greater detail below, can analyze access logs to determine if an identity is over privileged. A system identity may be over privileged if the system identity is not using all of the resources it is authorized to access. The access logs can allow the log analysis module 122 to identify resources that a system identity is authorized to access but has not used. In the example described above, the log analysis module 122 may collect access logs associated with the building, and evaluate the access logs to determine which floors the employee has accessed. The collected access logs may indicate that the employee accessed the second and third floors, but did not attempt to access other floors in the building. The log analysis module 122 may compare the actions of the system identity to its access policy to determine that the system identity is over privileged (e.g., the system identity only accessed some of the floors that he/she was authorized to access). In other embodiments, over privileged identities can be specified by a client device 140 or all system identities in a system can be assumed to be over privileged.

The log analysis module 122 analyzes access logs associated with the system 110. Access logs can include information related to requests made by an identity to a particular resource such as a time stamp associated with the request and the result of the request (e.g., the request was denied, the request was approved, a file was downloaded, etc.). In the embodiment of FIG. 1, an over privileged system identity (e.g., system identity 115a, system identity 115b, system identity 115c) is identified, and the log analysis module 122 analyzes access logs collected over a period of time. The period of time can be selected by the implementer, set by a client device 140 or automated by the log analysis module 122. The period of time can be any length of time (e.g., hours, days, weeks, etc.). In a typical implementation, the period of time is chosen to be long enough to collect an adequate number of access logs for sufficient analysis, as it may reduce a number of monitoring time windows, described in greater detail below in relation to FIG. 3. In other embodiments, the access logs may be retrieved from a database. The log analysis module 122 generates a restricted access policy for the over privileged system identity based on past requests made by the over privileged system identity. For example, system identity 115a has an initial access policy that grants the system identity 115a access to three resources: webpage A, webpage B, and webpage C. The access logs of a plurality of resources, including access logs of webpages A, B, and C, are collected for a period of time. The log analysis module 122 analyzes the collected access logs and determines that the system identity 115a requested access to webpage A, but did not request access to webpage B or C during the period of time. Subsequently, the log analysis module 122 generates a restricted access policy that allows the system identity 115a access to webpage A, but not webpage B or C.

The access privilege module 124 reduces the privileges of an over privileged system identity (e.g., system identity 115a, system identity 115b, system identity 115c) based on the analysis of the log analysis module 122. The access privilege module 124 can replace an initial access policy of a system identity with a restricted access policy. In the previous example, the initial access policy allowed the system identity 115a access to webpages A, B, and C. The access privilege module 124 replaces the initial access policy with the restricted access policy so that the system identity 115a only has access to webpage A.

The continuous monitoring and access management (CMAM) module 126 is configured to dynamically adjust access privileges of a previously over privileged system identity (e.g., 115a, 115b, 115c). The CMAM module 126 collects and analyzes access logs for a monitoring time window (e.g., a pre-defined time period). The monitoring time window (MTW), described in greater detail below, can be set by a client device 140 or automated by the CMAM module 126. The MTW can be any length of time (e.g., hours, days, weeks, etc.) appropriate for collecting a meaningful set of access logs. The MTW may be different than the period of time described above in relation to the log analysis module 122. The CMAM module 126 can evaluate errors in the access logs collected during the monitoring time window, described in greater detail below in relation to FIG. 3. Errors may be referred to herein as errors or access denied errors. In one embodiment, described in greater detail below, access denied errors are compared to an ignore list 128. In other embodiments, the CMAM module 126 does not include an ignore list 128. The CMAM module 126 can determine if a system identity is authorized to perform the action on the resource extracted from the error. In some embodiments, the CMAM module 126 may compare the action to the initial access policy of the system identity to determine if the system identity is authorized to perform the action, assuming actions included in the initial access policy are authorized. In alternative embodiments, the CMAM module 126 determines if the action is authorized according to information (e.g., an index of authorized and/or non-authorized actions) provided by the system 110. In alternative embodiments, an authorization check can be performed in any suitable manner. If a system identity is authorized to perform the action, the CMAM module 126 updates the restricted access policy of the system identity to allow for performance of the action.

Continuing with the previous example, system identity 115a (with its restricted access policy) performs its normal operations for a monitoring time window. Access logs are collected for the monitoring time window, and the CMAM module 126 identifies an error and extracts information associated with the error from the collected access logs. For example, the CMAM module 126 extracts "[system identity 115a, webpage B, open]" from the collected access logs. The error indicates that system identity 115a attempted to open webpage B during the monitoring time window, but the action resulted in an error (e.g., system identity 115a was denied the request to open webpage B). Note in this embodiment, for simplicity of illustration it is assumed that "open" is a general request for access to a webpage, but this may not be true in other embodiments (e.g., "open" can have a different meaning in a different context). The CMAM module 126 performs an authorization check to determine if system identity 115a is authorized to perform the action "open" on webpage B. The authorization check is passed (e.g., system identity 115a was allowed to perform the action "open" on webpage B in its initial access policy, so it is assumed that the identity is authorized to perform the action), so the access policy of system identity 115a is updated to include [open, webpage B]. The updated access policy now allows system identity 115a access to webpage A and webpage B, but not webpage C. System identity 115a now has a greater access level than its restricted access policy, but has a lower access level than its initial access policy, as described below in relation to FIG. 2.

Figure 2:
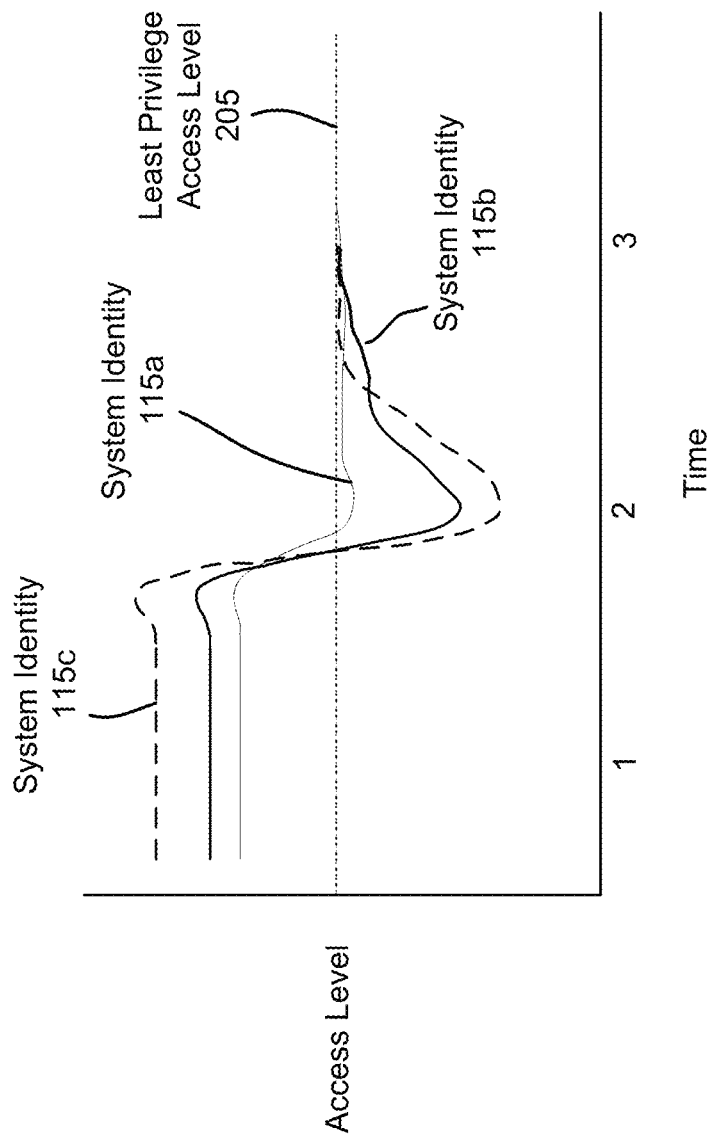
FIG. 2 is a graph illustrating a change in access level over time of system identities, according to one or more embodiments.

FIG. 2 is a graph illustrating a change in access level over time of system identities, according to the embodiment of FIG. 1. As described above in relation to FIG. 1, system identities 115a, 115b, and 115c are initially over privileged (e.g., at time=1). Each system identity has an initial access policy corresponding to an access level on the graph (e.g., system identity 115a has the lowest access level and system identity 115c has the highest access level). In other embodiments, each system identity can have the same access level. In the example described in relation to FIG. 1, initially, system identity 115a has access to webpages A, B, and C. Similarly, the system identity 115b may have access to webpages A, B, C, D, E and the system identity 115c may have access to webpages A, B, C, D, E, F, and G. Access logs associated with the system are collected for a period of time and restricted access policies for each system identity (e.g., 115a, 115b, 115c) are generated based on analysis of the collected access logs. Between time=1 and time=2, the initial access policy of each system identity is replaced with a restricted access policy. In the embodiment of FIG. 2, the initial access policies of each system identity are replaced with restricted access policies simultaneously in order to adjust access levels quickly. In alternative embodiments, the initial access policies of each system identity can be replaced at different times in order to minimize service disruptions. In the embodiment of FIG. 2, each system identity reaches an access level defined by the restricted access policy at time=2. This can be considered a baseline access level, where each system identity may not be reduced below the baseline access level. Each system identity can have a unique access level at time=2, according to the analysis of the collected access logs. The graph demonstrates that each system identity has an access level lower than its initial access level and lower than a least privilege access level 205 at time=2.

The CMAM module 126, described above in relation to FIG. 1, analyzes system identities 115a, 115b, and 115c between time=2 to time=3. By time=3, each of the system identities reaches its least privilege access level 205. In some embodiments, as illustrated in FIG. 2, the least privilege access level 205 may be the same for each system identity (e.g., system identities 115a, 115b, and 115c have access to the same resources, such as webpages A and B). In other embodiments, the least privilege access level 205 varies for each system identity 115 (e.g., system identity 115a has access to webpage A and B and system identity 115c has access to webpage A, C, D, and E). Furthermore, in other embodiments, time taken for each system identity to reach the least privileged access level 205 can vary (e.g., system identity 115b reaches its least privilege access level 205 at time=2.5 and system identity 115c reaches its least privilege access level 205 at time=3.5). In some embodiments, the least privilege access level 205 may be the same as the baseline access level (e.g., at time=2) for a system identity.

FIG. 1 and FIG. 2 describe an example of adjusting a system identity's access level in relation to webpages. It may be useful to restrict access to webpages to prevent users from navigating to undesired and/or malicious webpages (e.g., for parental controls on in home devices, for administrative control on school devices, for control of public devices/ networks, etc.). The example is primarily used for simplicity and illustration purposes. It may be useful to adjust privileges of system identities for other systems as well. In particular, when dealing with sensitive systems or systems associated with sensitive data, reducing privileges can prevent system breaches or help to minimize effects of a system breach. For example, it may be useful to reduce access privileges of system identities linked to a data management system. A system identity may only need access to certain components of a data management system for its functionality. If a system identity has access to an entire data management system, sensitive data such as financial information, personally identifiable information, health information, trade secrets, etc. associated with other system identities may be at risk for exposure.

In one example, a system identity of a data management system is an employee of a large company with thousands of employees. The employees of the company have access to the data management system which stores sensitive information related to the company. In one embodiment, the company may store information related to its clients competing in the same field (e.g., Competitor 1, Competitor 2, Competitor 3) in the data management system. Because the clients have competing interests, it may be in the best interest of the company and the clients to prevent information related to each client from being accessible by all employees (e.g., an employee working on a project for Competitor 2 should not have access to data related to Competitor 1). However, the company has granted an employee access to the entire data management system in order to prevent lost productivity due to over restrictive access policies. The employee has more access than is required for his/her functionality, allowing an increased risk of accidental or intentional exposure of sensitive data. In this embodiment, it may be useful to restrict the access policy of the employee in an efficient manner to protect the interests of competing clients and the company. Restricting access policies may also prevent and/or minimize the effects of a data breach if a system identity is compromised.

In another example, an over privileged robot has access to all controls on an assembly line (e.g., for manufacturing cars, devices, toys, etc.) In an event where the robot malfunctions, multiple stations of the assembly line may be compromised (e.g., a plurality of stations and/or components of an assembly line product are susceptible to damage). If the robot had been correctly privileged (e.g., only had access to controls of stations on the assembly line related to its functionality), the extent of the damage may be contained to those stations, effectively containing the impact of the malfunction. Other control systems (e.g., autonomous vehicles, airplane control panels, robotic medical devices, etc.) may function in a similar manner and can be dangerous if an over privileged system identity.

Figure 3:
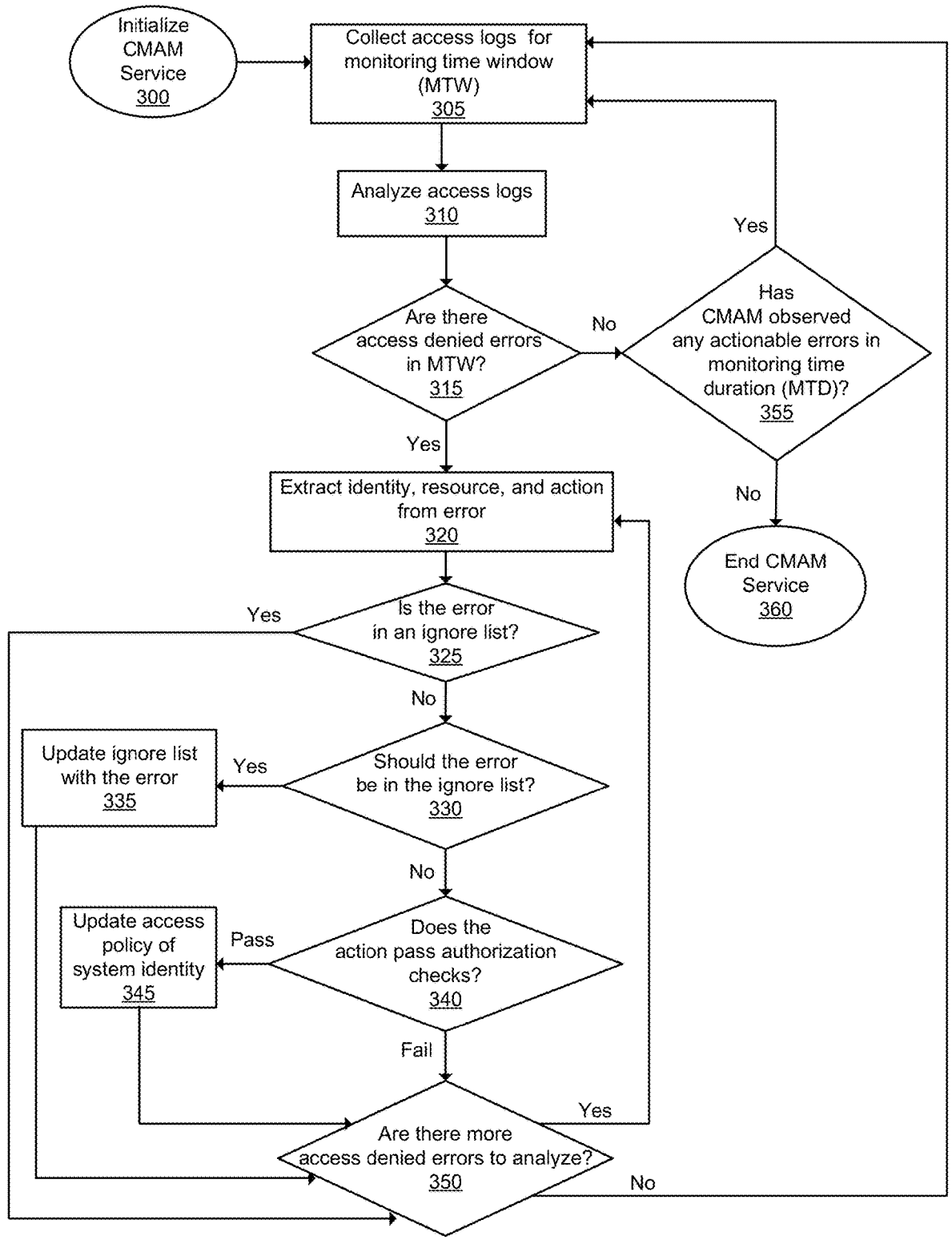
FIG. 3 is a flowchart illustrating a method of continuously monitoring and managing access policies, according to one or more embodiments.

As described in relation to FIG. 1, the CMAM module 126 adjusts access policies of system identities. FIG. 3 is a flowchart illustrating a method of continuously monitoring and managing access policies. In the embodiment, the CMAM module 126 can initiate a CMAM service configured to increase access privileges of a previously over privileged system identity. In alternative embodiments, the CMAM service can be configured to increase the privileges of an under privileged system identity. For example, a system authority can grant system identities a low access level (e.g., an access level below a least privileged access level), thus access privileges may be increased to reach the least privileged access level. Furthermore, in other embodiments, the steps of FIG. 3 may be performed in parallel, in different orders, or additional or fewer steps may be performed.

Subsequent to receiving a system identity with an access privilege below its least privilege access level, the CMAM service is initialized 300. Access logs associated with a system are collected 305 for a monitoring time window (MTW). The access logs can be collected from a plurality of resources associated with the system 110. The collected access logs are analyzed 310 to determine 315 if there are access denied errors in the MTW. An access denied error can be associated with an identity, a resource, an access type (e.g., an action or request), a timestamp, and an error message. In other embodiments, an access denied error can include other associated information. If an access denied error exists in the MTW, the identity, resource, and action are extracted 320 from the access denied error. Other relevant information, such as the time of the request, can also be extracted from the error. For example, an access denied error may appear as "[Wed Oct. 5 10:32:52 2018, error, client 555.0.0.1, client denied by server configuration, /export/home/live/ap/htdocs/test]" in a collected access log. The access denied error includes a date and time of the error (i.e., "Wed Oct. 5 10:32:52 2018"), a result (i.e., "error"), an IP address of a system identity (i.e., "client 555.0.0.1"), an error message (i.e., "client denied by server configuration"), and an action or request (i.e., "/export/home/live/ap/htdocs/test") that was denied. The identity, resource, and action can be extracted from the error.

The extracted error is compared to an ignore list 128 to determine 325 if the error is included in the ignore list 128. In one embodiment, an item in the ignore list 128 can include an identity, a resource, and an access type (e.g., an action or a request). For example, an item on an ignore list 128 may be [identity_1, production-document A1 bucket, read] where "identity_1" is the system identity, "production-document A1 bucket" is the resource, and "read" is the access type. This item may ignore all "read" requests by "identity_1" for the "production-document A1 bucket". An item on the ignore list 128 can also include regular expressions and wild card characters. For example, an item may be [identity_*, production-* A1 bucket, *]. This can allow the CMAM service to ignore all errors generated by a system identity beginning with "identity_" (e.g., identity_1, identity_2, identity_3 . . . ) for all A1 buckets that begin with "production-" for all operations (e.g, read, write, delete). In this embodiment, the asterisk represents all items within a category.

Responsive to the error being included in the ignore list 128, the error is ignored and the CMAM service can identify another error in the collected access logs, described in greater detail below. If the error is not included in ignore list 128, the CMAM service determines 330 if the error should be included in the ignore list 128. If the error should be included in the list, the ignore list 128 is updated 335 to include the error and the error is subsequently ignored. Actions considered optional may be added to the ignore list, described in greater detail below in relation to FIG. 4.

Figure 4:
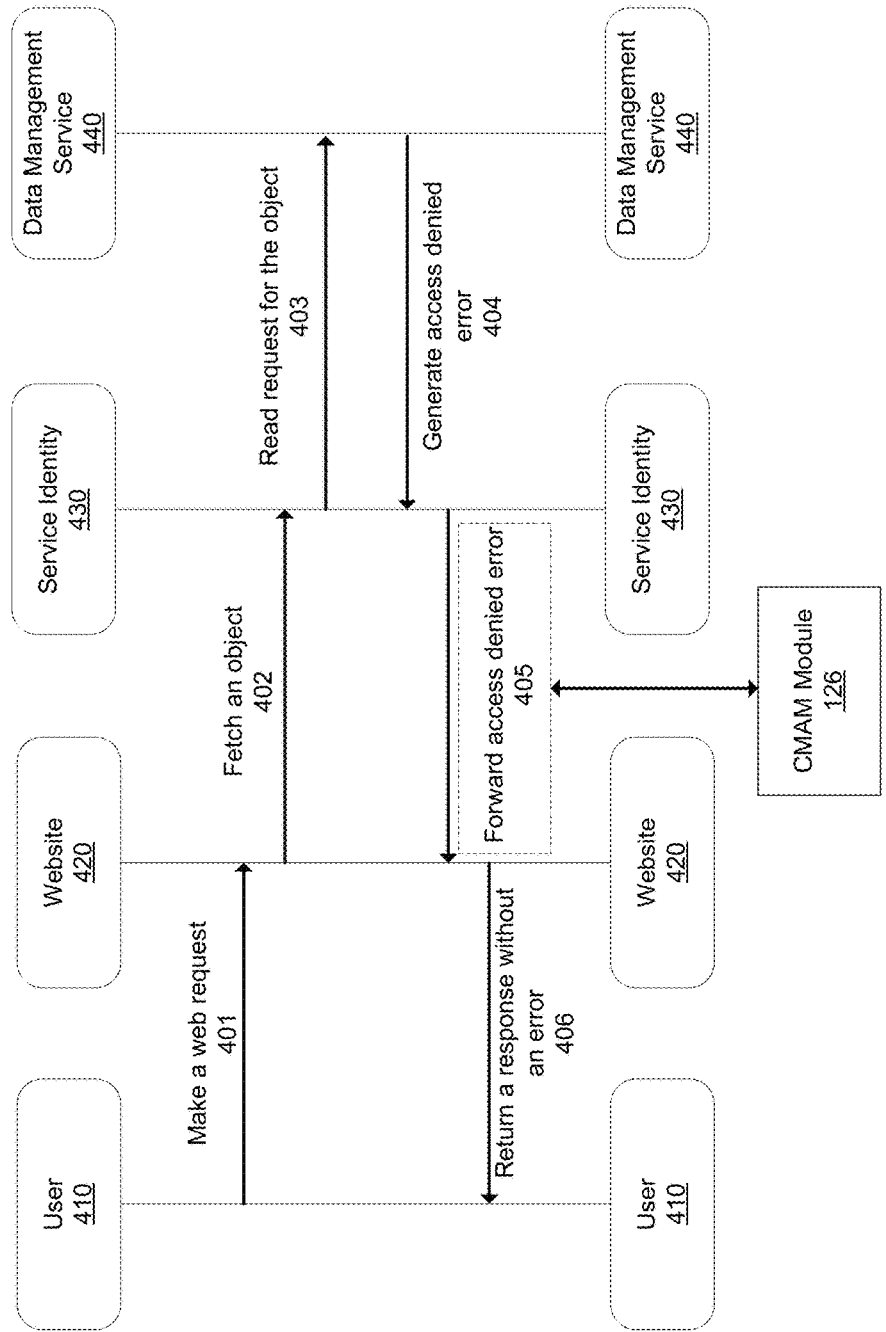
FIG. 4 is a schematic illustrating an error that may be added to an ignore list, according to one or more embodiments.

FIG. 4 is a schematic illustrating an error that should be added to an ignore list 128, according to one or more embodiments. In the embodiment of FIG. 4, a website 420 is using a data management service 440. A service identity 430 representing the website 420 is identified as an over privileged system identity (e.g., the service identity 430 should have restricted access to the data management service 440). In order to determine if an error should be in the ignore list 128, access logs of the website 420 can be analyzed when the service identity 430 of the website causes an exception.

In the embodiment of FIG. 4, a user 410 makes 401 a request to the website 420. In response, the website 420 attempts to fetch 402 an object from the data management service 440 and the service identity 430 reads 403 the request for the object. The data management service 440 generates 404 an access denied error in response to the request for the object (e.g., the data management service 440 does not allow the request). The service identity 430 forwards 405 the access denied error to the website 420. As described above, the CMAM module 126 can collect access logs associated with the website 420. As such, the CMAM module 126 can capture the access denied error generated by the data management service 440 in the collected access logs.

The CMAM module 126 determines that the access denied error is not already included on an ignore list 128, and analyzes the access denied error to determine if it should be included in the ignore list 128. If the website 420 required access to the object for its functionality (e.g., the website 420 and its associated service identity 430 are authorized to perform the action), the website 420 can return an access denied error to the user 410 (e.g., the error captured in the access logs should not be added to the ignore list 128). In this case, the error can be further analyzed by the CMAM module 126 (e.g., the CMAM module 126 may determine if the service identity 430 is authorized to perform the action and subsequently update the access policy of the service identity 430). On the other hand, in the embodiment of FIG. 4, the website 420 does not require access to the object (e.g., the request is optional for functionality). As such, the error is added to the ignore list 128 and the website 420 returns 406 a response without an error to the user 410 (e.g., the error is ignored), assuming that the website 420 is not malicious and is behaving as expected. In the embodiment, the ignore list 128 now includes the action associated with the error and subsequent errors of this type may thus be ignored by the CMAM service. In alternative embodiments, an error message can be evaluated manually to determine if the error should be included in an ignore list 128. In some embodiments, access denied exceptions (e.g., returning a response without an error as shown in FIG. 4) can be reviewed by a human user before granting additional access and the ignore list 128 can be populated manually.

If the error should not be included in the ignore list 128, an authorization check is performed on the error to determine 340 if the system identity is authorized to perform the action extracted from the error as shown in FIG. 3. If the authorization check is passed (e.g., the system identity is allowed to perform the action on the resource), the access policy of the system identity is updated 345 to allow for performance of the action on the resource extracted from the access denied error. In some embodiments, the CMAM module 126 may compare the action associated with the error to the initial access policy of the system identity to determine if the system identity is authorized to perform the action (e.g., assuming actions included in the initial access policy are authorized). In alternative embodiments, the CMAM module 126 determines if the action is authorized based on data provided by the system 110 and/or the client device 140. As such, subsequent attempts by the system identity to perform the action should not be denied. If the authorization check is failed, the access denied error is ignored and the CMAM service determines 350 if there are additional access denied errors to analyze in the access logs collected during the MTW. If another error exists, the identity, resource and action are extracted from the error. The analysis (e.g., beginning with 320) can be repeated for the error until the remaining errors pertaining to a particular system identity in the access logs collected during the MTW are analyzed. If the errors have been analyzed, access logs are collected 305 for a subsequent monitoring time window. The subsequent MTW may be the same length as the first MTW, or it may be adjusted based on the quantity and/or type of errors found in the first MTW. The access logs are analyzed 310 to determine if one or more access denied errors exists 315 in the subsequent MTW. If an access denied error exists in the subsequent MTW, an error is analyzed in the same manner as previously described (e.g., beginning with 320).

In some embodiments, access denied errors may not occur in a first MTW, but they may occur in subsequent MTWs (e.g., a first access denied error occurs during a fifth MTW). As such, in various embodiments access logs are collected for several MTWs to ensure a system identity is granted an appropriate level of access. Thus, if access denied errors are not identified in the subsequent MTW, the CMAM service is analyzed over a monitoring time duration (MTD). The MTD is a pre-defined period of time that can be an appropriate length of time for allowing a system identity to achieve a least privileged access level. The MTD may be automated by the CMAM module 126, or it may be set by a client device 140. In general, the MTD is longer than the MTW (e.g., the MTD can include a plurality of MTWs). For example, the MTW may be a short time window, such as 6 hours and the MTD can be a longer time interval, such as 300 hours. In some embodiments, the MTD may be set to include a specified number of MTWs (e.g., 10, 50, 100, etc.). Access logs can be collected at least fifty times, each time for a six-hour period. Access logs collected during the MTD are analyzed to determine if any actionable errors occurred during the MTD. If there are any errors during the MTD (e.g., 300-hour period), access logs are collected for another MTW (e.g., 6-hour period) and the process can be repeated. If there are no errors in the MTD, the CMAM service can be terminated 360.

The MTD may be long enough so that the system identity reaches an appropriate level of access for its functionality (e.g., a final access policy of the system identity follows the least privilege access policy). In the embodiment of FIG. 2, the time period from time=2 to time=3 is the MTD. Within the MTD, there can be a plurality of MTWs (e.g., time=2 to time=2.1, time=2.1 to time=2.2, etc.). In FIG. 2, the MTD and the MTW can be the same for each system identity. In alternative embodiments, the MTD and the MTW can be different for each system identity.

Figure 5:
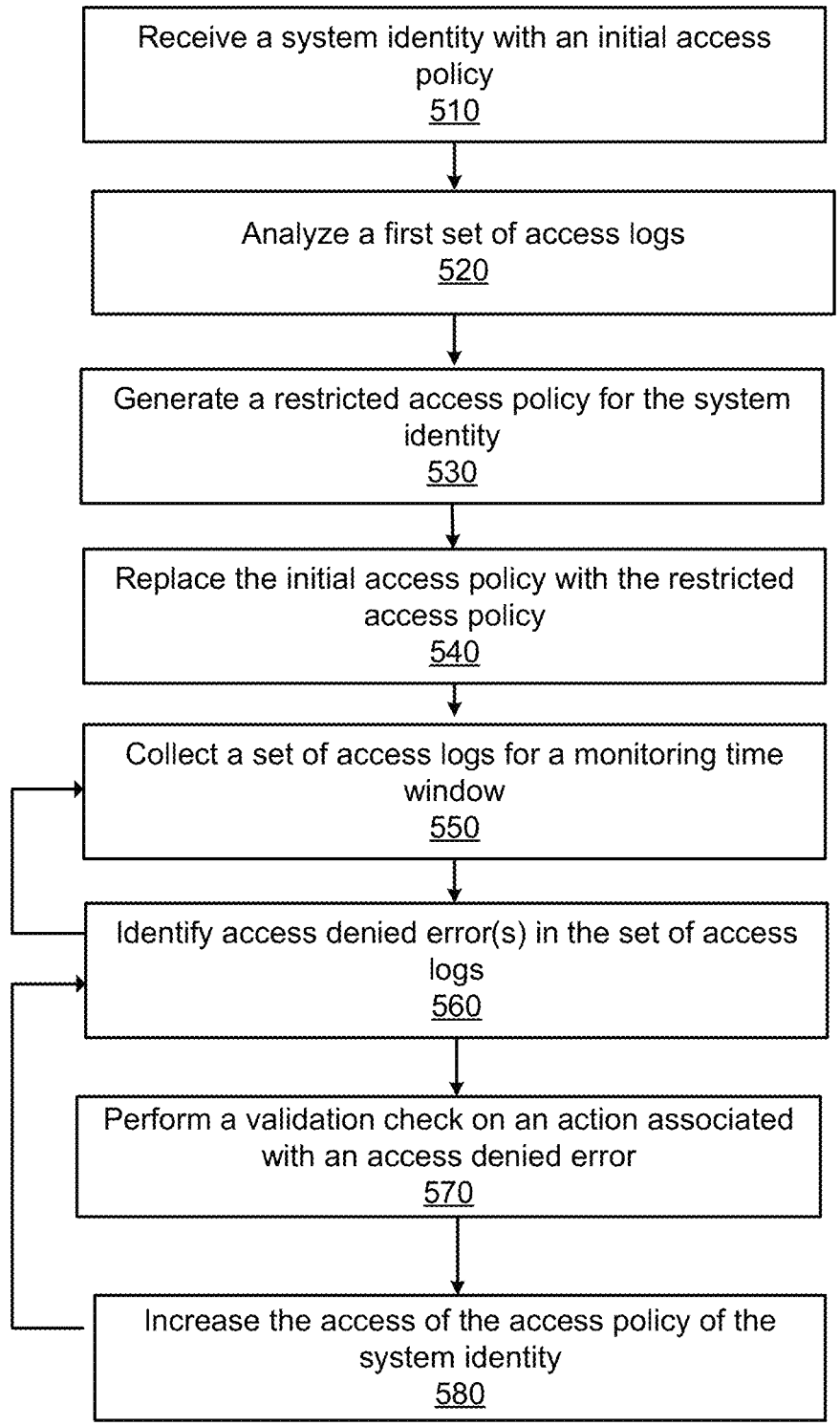
FIG. 5 is a flowchart illustrating a method for adjusting access policies of system identities, according to one or more embodiments.

FIG. 5 illustrates a method 500 for dynamically adjusting the access policy of a system identity, according to one or more embodiments. The steps of FIG. 5 are illustrated from the perspective of a processor performing the method 500. However, some or all of the steps may be performed by other entities or components. In addition, some embodiments may perform the steps in parallel, perform the steps in different orders, or perform different steps.

A system identity with an initial access policy is received 510. A first set of access logs associated with a system are analyzed 520. The access logs can be stored in and retrieved from a database. In other embodiments, access logs associated with a system are collected for a period of time (e.g., a day, a week, a month, etc.). Based on the analysis of the first set of access logs, a restricted access policy for the system identity is generated 530. The initial access policy of the system identity is replaced 540 with the restricted access policy. Another set of access logs are collected 550 for a monitoring time window. The set of access logs are analyzed to identify 560 an access denied error. If an access denied error is identified, a validation check is performed 570 to determine whether the system identity is allowed to perform the action associated with the access denied error. An action associated with an access denied error may be compared to the initial access policy to determine if it is authorized, or the system may provide an index of authorized actions. Responsive to the error passing the validation check, the access policy of the system identity is increased 580 to include (e.g., allow for performance) of the action on the resource associated with the access denied error. After the access policy is adjusted, the set of access logs can be analyzed to identify 560 another access denied error in the monitoring time window. If there are no remaining access denied errors, another set of access logs may be collected for a subsequent monitoring time window.

Computing System Architecture

Figure 6:
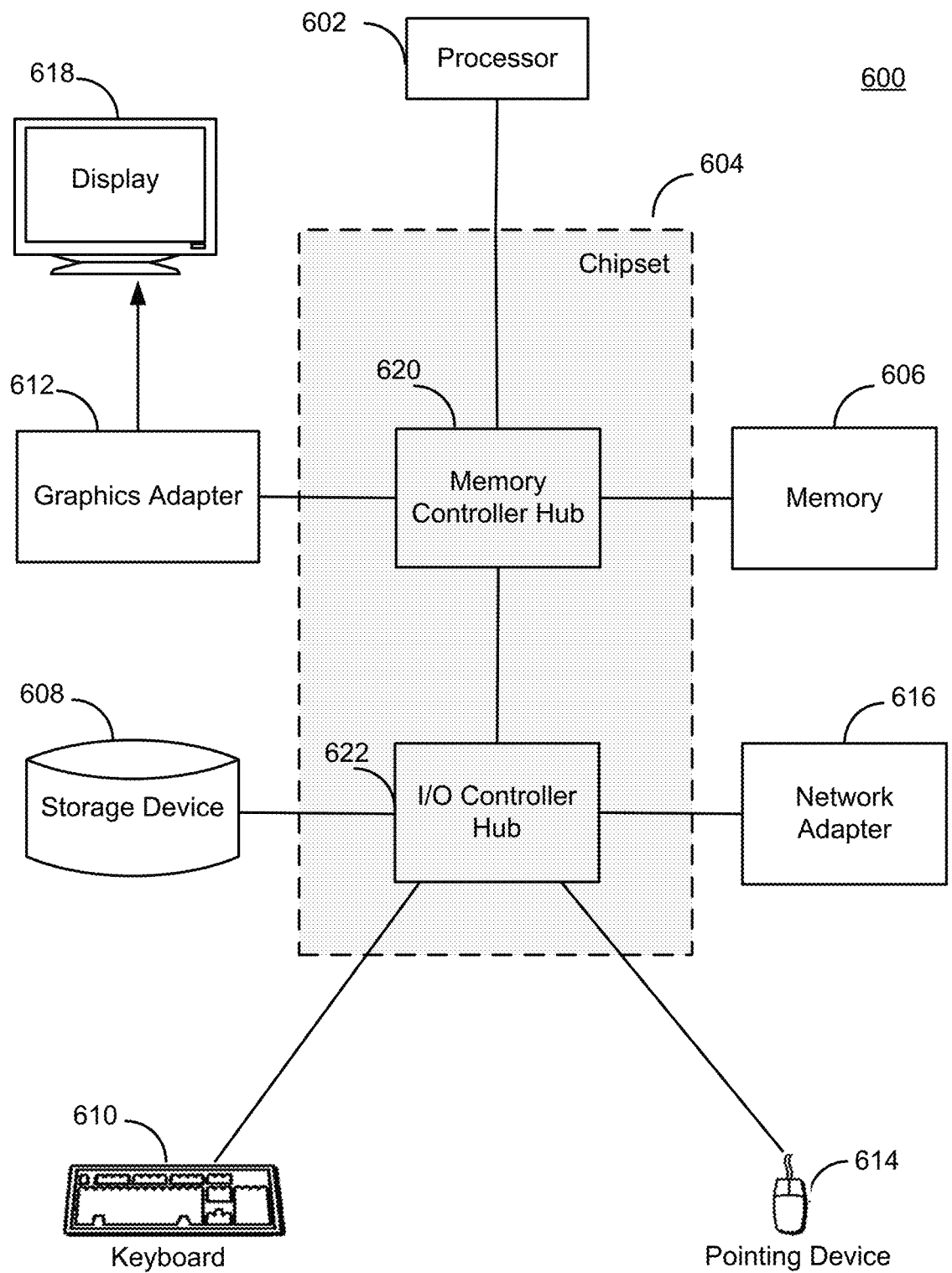
FIG. 6 is a diagram illustrating an example of a computer suitable for use in the system environment for managing access policies of system identities of FIG. 1, according to one embodiment.

FIG. 6 is a high-level block diagram illustrating an example of a computer 600 suitable for use in the system environment of FIG. 1, according to one embodiment. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 (which may be an on-screen keyboard) to input data into the computer system 600. The graphics adapter 612 displays images and other information on the display 618. The network adapter 616 couples the computer system 600 to one or more computer networks.

The types of computers used by the entities of FIGS. 1-5 can vary depending upon the embodiment and the processing power required by the entity. For example, system environment 100 might include a distributed database system comprising multiple blade servers working together to provide the functionality described. Furthermore, the computers can lack some of the components described above, such as keyboards 610, graphics adapters 612, and displays 618.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for dynamically adjusting the access policies of system identities. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method for managing an access policy of a system identity, the method comprising:
receiving, by a continuous monitoring and access management (CMAM) service, a system identity having an initial access policy comprising a set of privileges, each privilege authorizing the system identity to perform an action upon a resource;
analyzing, by the CMAM service, a first set of access logs of the system identity from a first time window, to identify actions performed upon resources by the system identity during the first time window;
generating, by the CMAM service, a restricted access policy for the system identity based at least in part on the analyzed first set of access logs, wherein the restricted access policy comprises access privileges for the resources upon which the system identity performed actions during the first time window;
for each of a successive set of time windows:
analyzing, by the CMAM service, a respective set of logs of the system identity to identify an error associated with a blocked action;
responsive to identifying the error, performing, by the CMAM service, a validation check to determine whether the system identity is authorized to perform the blocked action associated with the error; and
responsive to determining that the system identity is authorized to perform the blocked action associated with the error, adjusting, by the CMAM service, the restricted access policy of the system identity to add a permission for the blocked action associated with the error;
determining, by the CMAM service, for a final time window, that a respective set of logs has no errors; and
responsive to determining, by the CMAM service, for the final time window, that the respective set of logs has no errors, terminating the CMAM service for the system identity.

2. The method of claim 1, further comprising:
determining, by the CMAM service, whether the error is included in an ignore list, wherein an item in the ignore list comprises one or more of: a system identity, a resource, or an action.

3. The method of claim 2, further comprising:
analyzing, by the CMAM service, the error to determine whether to include the error in the ignore list.

4. The method of claim 1,
wherein collecting a respective set of access logs for a particular time window in the successive set of time windows is responsive to determining that an error exists in a preceding time window in the successive set of time windows.

5. The method of claim 1, further comprising:
responsive to determining that the respective set of logs for the final time window has no errors, providing, by the CMAM service, the system identity to a separate computing system.

6. The method of claim 1, further comprising:
for a particular time window in the successive set of time windows:
determining, by the CMAM service, that a respective set of logs of the system identity includes a particular error associated with a blocked action;
determining, by the CMAM service, whether the particular error is included in an ignore list; and
responsive to determining that the particular error is included in the ignore list, ignoring, by the CMAM service, the particular error.

7. The method of claim 1, further comprising:
for a particular time window in the successive set of time windows:
determining, by the CMAM service, that a respective set of logs of the system identity includes a particular error associated with a blocked action;
determining, by the CMAM service, whether the particular error is included in an ignore list;
responsive to determining that the particular error is not included in the ignore list, determining, by the CMAM service, whether to include the particular error in the ignore list; and
responsive to determining that the particular error is included in the ignore list, updating, by the CMAM service, the ignore list to include the particular error.

8. A non-transitory computer-readable storage medium storing computer program instructions executable by one or more processors, the computer program instructions comprising instructions to:
receive, by a continuous monitoring and access management (CMAM) service, a system identity having an initial access policy comprising a set of privileges, each privilege authorizing the system identity to perform an action upon a resource;

analyze, by the CMAM service, a first set of access logs of the system identity from a first time window, to identify actions performed upon resources by the system identity during the first time window;

generate, by the CMAM service, a restricted access policy for the system identity based at least in part on the analyzed first set of access logs, wherein the restricted access policy comprises access privileges for the resources upon which the system identity performed actions during the first time window;

for each of a successive set of time windows:
analyze, by the CMAM service, a respective set of logs of the system identity to identify an error associated with a blocked action;

responsive to identifying the error, perform, by the CMAM service, a validation check to determine whether the system identity is authorized to perform the blocked action associated with the error; and responsive to determining that the system identity is authorized to perform the action associated with the error, adjust, by the CMAM service, the restricted access policy of the system identity to add a permission for the blocked action associated with the error;

determine, by the CMAM service, for a final time window, that a respective set of logs has no errors; and responsive to determining, by the CMAM service, for the final time window, that the respective set of logs has no errors, terminate the CMAM service for the system identity.

9. The non-transitory computer-readable storage medium of claim 8, the computer program instructions further comprising instructions to:
determine, by the CMAM service, whether the error is included in an ignore list, wherein an item in the ignore list comprises one or more of: a system identity, a resource, or an action.

10. The non-transitory computer-readable storage medium of claim 9, the computer program instructions further comprising instructions to:
analyze, by the CMAM service, the error to determine whether to include the error in the ignore list.

11. The non-transitory computer-readable storage medium of claim 8, wherein collecting a respective set of access logs for a particular time window in the successive set of time windows is responsive to determining that an error exists in a preceding time window in the successive set of time windows.

12. The non-transitory computer-readable storage medium of claim 8, the computer program instructions further comprising instructions to:
responsive to determining that the respective set of logs for the final time window has no errors, provide, by the CMAM service, the system identity to a separate computing system.

13. The non-transitory computer-readable storage medium of claim 8, the computer program instructions further comprising instructions to:
for a particular time window in the successive set of time windows:
determine, by the CMAM service, that a respective set of logs of the system identity includes a particular error associated with a blocked action;
determine, by the CMAM service, whether the particular error is included in an ignore list; and responsive to determining that the particular error is included in the ignore list, ignore, by the CMAM service, the particular error.

14. The non-transitory computer-readable storage medium of claim 8, the computer program instructions further comprising instructions to:
for a particular time window in the successive set of time windows:
determine, by the CMAM service, that a respective set of logs of the system identity includes a particular error associated with a blocked action;
determine, by the CMAM service, whether the particular error is included in an ignore list;
responsive to determining that the particular error is not included in the ignore list, determine, by the CMAM service, whether to include the particular error in the ignore list; and
responsive to determining that the particular error is included in the ignore list, update, by the CMAM service, the ignore list to include the particular error.

15. A computing system comprising:
one or more processors; and
a non-transitory computer-readable storage medium storing computer program instructions executable by the one or more processors, the computer program instructions comprising instructions to:
receive, by a continuous monitoring and access management (CMAM) service, a system identity having an initial access policy comprising a set of privileges, each privilege authorizing the system identity to perform an action upon a resource;
analyze, by the CMAM service, a first set of access logs of the system identity from a first time window, to identify actions performed upon resources by the system identity during the first time window;
generate, by the CMAM service, a restricted access policy for the system identity based at least in part on the analyzed first set of access logs, wherein the restricted access policy comprises access privileges for the resources upon which the system identity performed actions during the first time window;
for each of a successive set of time windows:
analyze, by the CMAM service, a respective set of logs of the system identity to identify an error associated with a blocked action;
responsive to identifying the error, perform, by the CMAM service, a validation check to determine whether the system identity is authorized to perform the blocked action associated with the error; and
responsive to determining that the system identity is authorized to perform the action associated with the error, adjust, by the CMAM service, the restricted access policy of the system identity to add a permission for the blocked action associated with the error;
determine, by the CMAM service, for a final time window, that a respective set of logs has no errors; and
responsive to determining, by the CMAM service, for the final time window, that the respective set of logs has no errors, terminate the CMAM service for the system identity.

16. The system of claim 15, the computer program instructions further comprising instructions to:

determine, by the CMAM service, whether the error is included in an ignore list, wherein an item in the ignore list comprises one or more of: a system identity, a resource, or an action.

17. The system of claim 16, the computer program instructions further comprising instructions to:
analyze, by the CMAM service, the error to determine whether to include the error in the ignore list.

18. The system of claim 15, wherein collecting a respective set of access logs for a particular time window in the successive set of time windows is responsive to determining that an error exists in a preceding time window in the successive set of time windows.

19. The system of claim 15, the computer program instructions further comprising instructions to:
for a particular time window in the successive set of time windows:
determine, by the CMAM service, that a respective set of logs of the system identity includes a particular error associated with a blocked action;
determine, by the CMAM service, whether the particular error is included in an ignore list; and
responsive to determining that the particular error is included in the ignore list, ignore, by the CMAM service, the particular error.

20. The system of claim 15, the computer program instructions further comprising instructions to:
for a particular time window in the successive set of time windows:
determine, by the CMAM service, that a respective set of logs of the system identity includes a particular error associated with a blocked action;
determine, by the CMAM service, whether the particular error is included in an ignore list;
responsive to determining that the particular error is not included in the ignore list, determine, by the CMAM service, whether to include the particular error in the ignore list; and
responsive to determining that the particular error is included in the ignore list, update, by the CMAM service, the ignore list to include the particular error.

* * * * *